(12) United States Patent
Dai

(10) Patent No.: US 8,395,817 B2
(45) Date of Patent: Mar. 12, 2013

(54) IMAGE PROCESSING APPARATUS AND METHOD DETERMINES ATTRIBUTES OF IMAGE BLOCKS BASED ON PIXEL EDGE INTENSITIES RELATIVE TO NORMALIZED AND FIXED THRESHOLDS

(75) Inventor: Xiaoyan Dai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 317 days.

(21) Appl. No.: 12/962,325

(22) Filed: Dec. 7, 2010

(65) Prior Publication Data

US 2011/0164284 A1 Jul. 7, 2011

(30) Foreign Application Priority Data

Jan. 6, 2010 (JP) ................................. 2010-001564

(51) Int. Cl.
*H04N 1/409* (2006.01)
*G06T 5/00* (2006.01)
*G06K 9/46* (2006.01)
*G06K 9/54* (2006.01)

(52) U.S. Cl. ........ 358/1.9; 358/2.1; 358/2.99; 358/3.24; 358/3.27; 382/194; 382/199; 382/205; 382/254; 382/266; 382/274

(58) Field of Classification Search ................... 358/1.9, 358/2.1, 2.99, 3.06, 3.24, 3.26, 3.27, 1.11, 358/1.18, 448, 462, 463; 382/190, 194, 195, 382/199, 205, 254, 266, 274, 275
See application file for complete search history.

(56) References Cited

U.S. PATENT DOCUMENTS

| 6,157,737 | A | 12/2000 | Ishikawa et al. | |
|---|---|---|---|---|
| 6,873,436 | B1 | 3/2005 | Terada et al. | |
| 7,130,469 | B2 * | 10/2006 | Adachi | 382/199 |
| 7,330,600 | B2 * | 2/2008 | Nishida | 382/274 |
| 2010/0260417 | A1 * | 10/2010 | Dai | 382/165 |
| 2011/0158517 | A1 * | 6/2011 | Dai | 382/195 |

FOREIGN PATENT DOCUMENTS

| JP | 64-081080 | | 3/1989 |
|---|---|---|---|
| JP | 10-108012 | A | 4/1998 |
| JP | 10-283475 | A | 10/1998 |
| JP | 2002-142128 | A | 5/2002 |

OTHER PUBLICATIONS

U.S. Appl. No. 12/962,377, filed Dec. 7, 2010. Applicant: Xiaoyan Dai.

\* cited by examiner

*Primary Examiner* — Scott A Rogers
(74) *Attorney, Agent, or Firm* — Fitzpatrick, Cella, Harper & Scinto

(57) ABSTRACT

An image processing apparatus determines the attribute of a pixel block, which is composed of a prescribed number of pixels extracted from image data, and the attribute of an area in which each pixel of the pixel block belongs. Then, based upon the determined attribute of the image block and the determined attribute of the area in which each pixel belongs, the apparatus subjects the image data to processing, pixel by pixel.

8 Claims, 10 Drawing Sheets

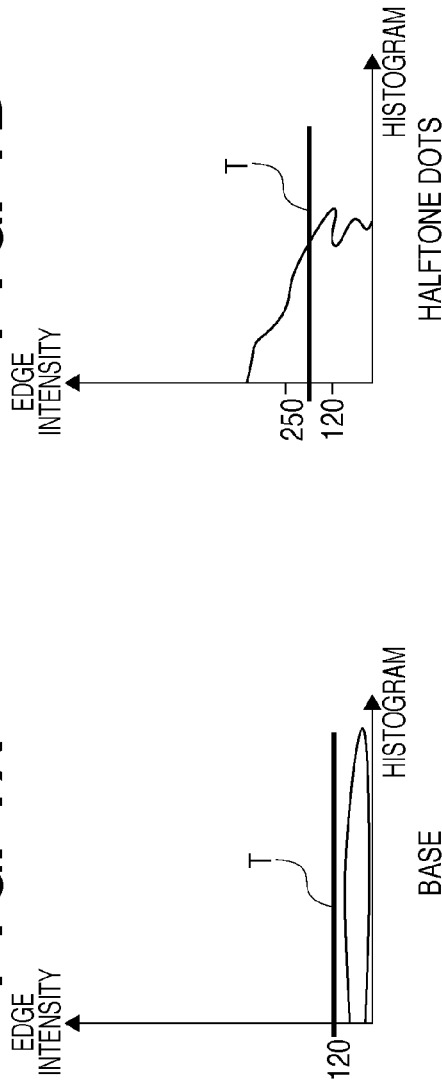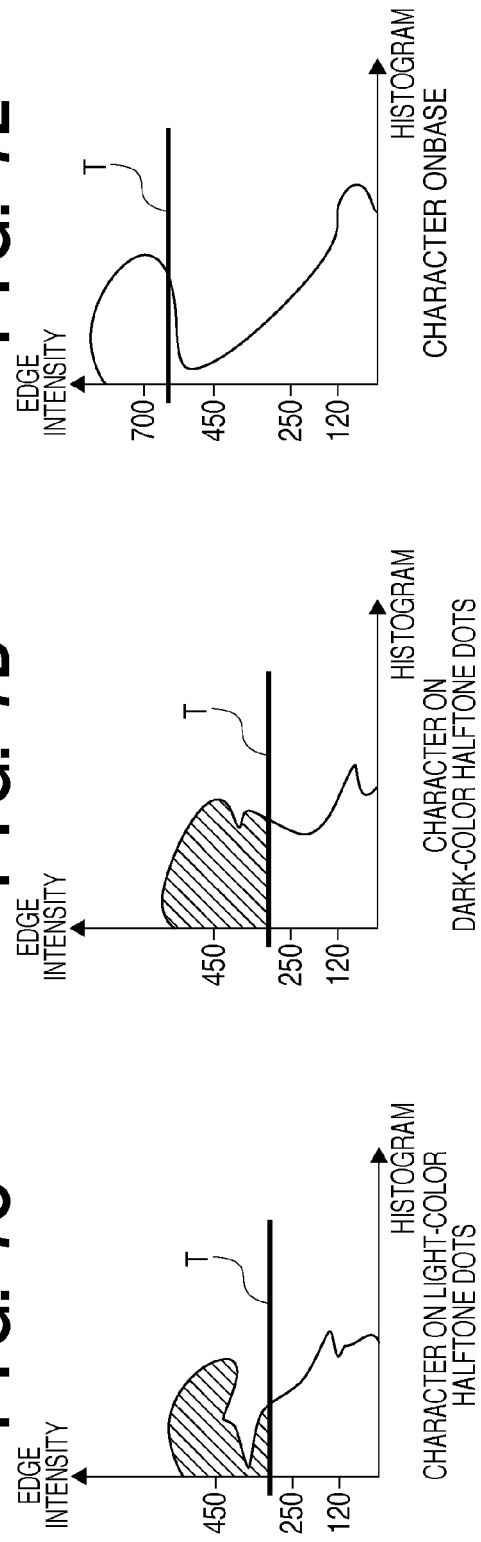

FIG. 8

| | BASE | HALFTONE DOTS | CHARACTE ON BASE | CHARACTER ON HALFTONE DOTS (CHARACTER ON DARK-COLOR HALFTONE DOTS / CHARACTER ON LIGHT-COLOR HALFTONE DOTS) | |
|---|---|---|---|---|---|
| NORMALIZATION THRESHOLD VALUE | LOW (<250) | | HIGH (>500) | MEDIUM (250–500) | |
| NUMBER OF PIXELS HAVING EDGE INTENSITY HIGHER THAN NORMALIZATION THRESHOLD VALUE | LESS | MORE | MORE | MORE | LESS |
| NUMBER OF PIXELS HAVING EDGE INTENSITY HIGHER THAN FIXED THRESHOLD VALUE | LESS | MORE | MORE | MORE | MORE |

F I G. 10

| BLOCK ATTRIBUTE | ATTRIBUTE FLAG OF CONNECTED REGION OF BLOCK | | | |
| --- | --- | --- | --- | --- |
| | | BASE | HALFTONE DOTS | CHARACTER |
| BASE | | 1 | 0 | 0 |
| HALFTONE DOTS | | 0 | 1 | 0 |
| CHARACTER ON BASE | BASE | 1 | 0 | 0 |
| | CHARACTER | 1 | 0 | 1 |
| CHARACTER ON HALFTONE DOTS | HALFTONE DOTS | 0 | 1 | 0 |
| | CHARACTER | 0 | 1 | 1 |

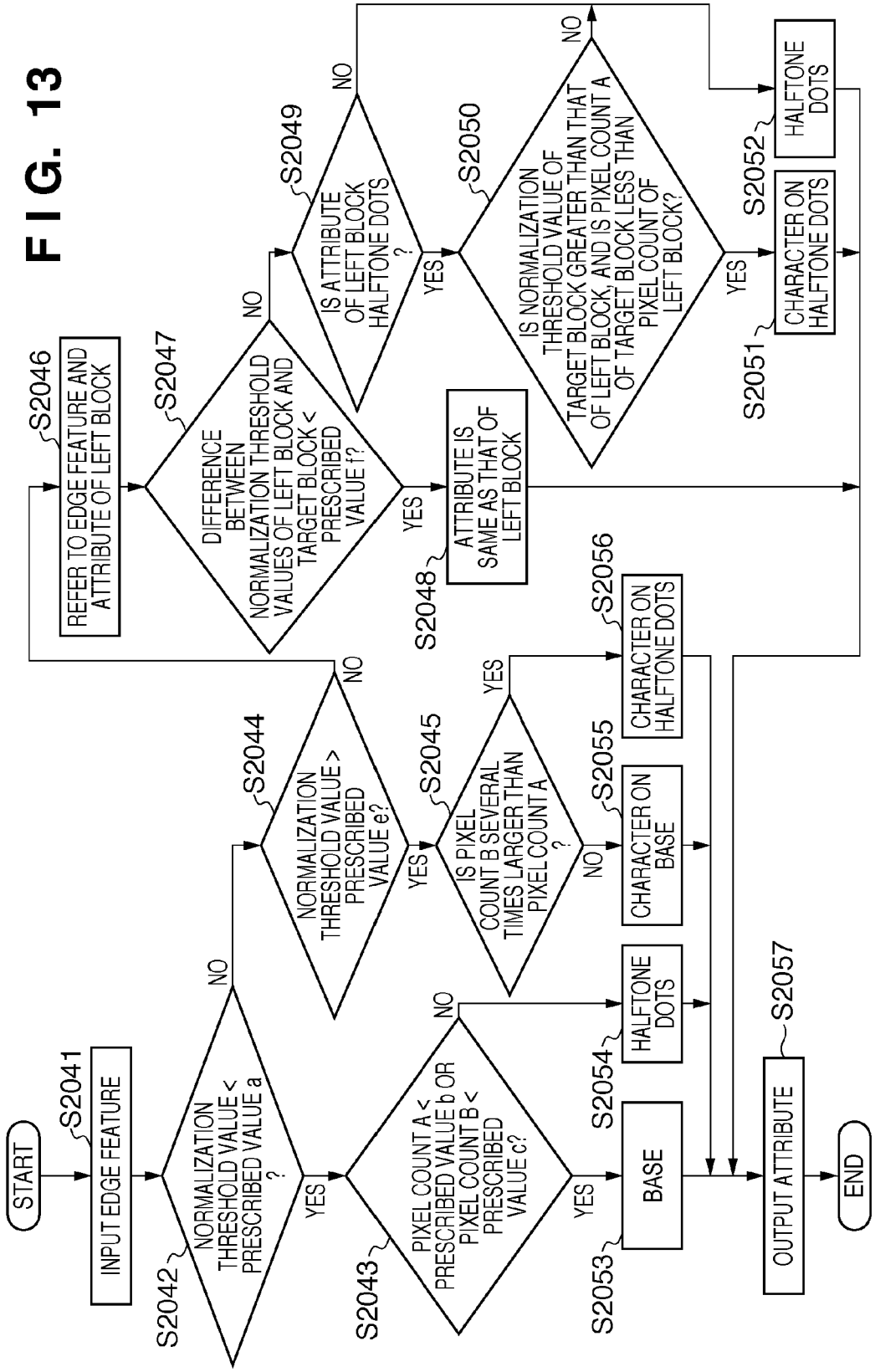

IMAGE PROCESSING APPARATUS AND METHOD DETERMINES ATTRIBUTES OF IMAGE BLOCKS BASED ON PIXEL EDGE INTENSITIES RELATIVE TO NORMALIZED AND FIXED THRESHOLDS

BACKGROUND OF THE INVENTION

1. Field of the Invention

The present invention relates to an image processing apparatus and to an image processing method.

2. Description of the Related Art

Digital copiers in which a color document image is read by a CCD sensor and the image is output by a digital printer have become widely available in recent years. FIG. 1 is a block diagram illustrating the configuration of a digital copier. Image data that has been input from an image scanning unit 1001 is held in a storage unit 1004 temporarily after it is subjected to scan image processing by an image processing unit 1002. When the image is printed, the image data held in the storage unit 1004 is sent to the image processing unit 1002 where it is subjected to print image processing and then to a printing unit 1003, where the image is printed.

More specifically, the image processing unit 1002 generates attribute information such as character, halftone dots or base from the input image data and stores this attribute information in the storage unit 1004. At this time the image data is subjected to processing such as filter processing, gamma processing or tone processing adaptively in accordance with the attribute information and is then stored in the storage unit 1004. Thereafter, once the image data has been stored, it is output by the printing unit 1003.

Several examples of control can be mentioned with regard to the changeover of adaptive image processing in accordance with the above-mentioned attribute information, and such control includes application of white-fill processing to white base background pixels, application of color smoothing processing to halftone-dot pixels, application of color enhancement processing to black character pixels in base background, and non-application of character color enhancement processing to character pixels in a halftone-dot background. In order for scan image processing and print image processing to achieve a high-quality image output, generating highly accurate attribute information is important.

Various methods based upon image data in real space have been proposed thus far as methods of generating the attribute information of an input image. For example, there is an image processing method which, based upon frequency components of an orthogonal transform of a block comprising a prescribed number of pixels of an input image, determines whether this block is either a character area or a halftone-dot area or the like (see the specifications of Japanese Patent Laid-Open Nos. 64-81080 and 10-108012).

Further, there is an image processing method that includes determining, for every pixel in a block, whether the pixel is a character pixel or a halftone-dot pixel or the like, utilizing the attribute of the area determined based upon the attribute information of this pixel, and correcting the attribute of the pixel (see the specification of Japanese Patent Laid-Open No. 10-283475).

However, there are some problems with the examples of prior art cited above, which will now be described. FIG. 2 is a diagram illustrating block attribute information and results of block edge detection. Shown in FIG. 2 in this example are a character block A on the base background (single-color background), a character block B on a light-color halftone-dot background, a character block C on a dark-color halftone-dot background, and results D, E, F of edge extraction in the character blocks A, B, C, respectively.

It should be noted that the light-color halftone-dot background consists of a pattern of light-color halftone dots (the halftone-dot density is low, or the density value is less than 0.5), and the dark-color halftone-dot background consists of a pattern of dark-color halftone dots (the halftone-dot density is high, or the density value is 0.5 or greater). Further, the white portions in the results D, E, F indicate strong edges and the black portions indicate weak edges.

If binarization is performed from the maximum and minimum values of pixel edge intensity using a normalization threshold value, strong high-frequency components of each block can be extracted, as shown in FIG. 2. With regard to character area A on the base background, high-frequency components are extracted from the character portion. However, with regard to character area C on the dark-color halftone-dot background, high-frequency components are extracted not only from the character portion but also from the halftone-dot portion.

On the other hand, with regard to character area B on the light-color halftone-dot background, the high-frequency components of the halftone-dot portion are weak and therefore high-frequency components are extracted only from the character portion. This is the same as in the case of the background. As a consequence, the character area on the light-color halftone-dot background and the character area on the base background cannot be distinguished from each other. That is, a problem which arises is that a character area on the light-color halftone-dot background is erroneously determined to be a character on base background.

Further, an erroneous determination also occurs with a character block containing only a very small portion of a character. FIG. 3 is a diagram illustrating an example of a small-character area on a halftone-dot background. Since a character portion 301 in this character block is very small in comparison with a halftone-dot portion 302, there are very few high-frequency components indicating the features of the character portion. Consequently, a problem which arises is that even though the area contains part of a character, the area is erroneously determined to be a halftone-dot area.

Furthermore, print image processing differs greatly between that for a character on base background and that for a character on halftone dots background. Preferably, the character on the base background is subjected to edge enhancement, and in the case of a color image, it is preferred that color processing be executed such as application of undercolor removal processing to obtain the monochrome color black. On the other hand, if the same processing is applied to a character on halftone dots background, the halftone-dot portion is enhanced by edge emphasis and moiré patterns are produced. Conversely, therefore, it is preferred that smoothing processing be executed rather than enhancement processing. Further, if undercolor removal processing is executed, the character color is enhanced excessively in comparison with the surrounding color and this gives rise to a decline in image quality such as excessive enhancement of the character. Accordingly, it is better not to execute the above-mentioned processing in the case of a character on halftone dots background.

Thus, since block attributes and pixel attributes (halftone-dot pixels, character pixels and the like) cannot be extracted accurately, appropriate print image processing cannot be executed and one problem which arises from this is a decline in print image quality.

SUMMARY OF THE INVENTION

The present invention provides an apparatus and method for subjecting image data to image processing pixel by pixel using an attribute of a pixel block composed of a prescribed number of pixels extracted from pixel data and an attribute of an area in which each pixel of this pixel block belongs.

According to one aspect of the present invention, there is provided an image processing apparatus comprising: a dividing unit that divides image data into a plurality of blocks, each of which are composed of a prescribed number of pixels; an edge extraction unit that obtains edge intensity of each pixel contained in each block obtained by division; an edge feature extraction unit that obtains, in each block, a normalization threshold value based upon a maximum value and a minimum value of the edge intensity, which has been obtained by the edge extraction unit, and a preset fixed threshold value, and further obtains both a first number of pixels having edge intensity higher than the fixed threshold value and a second number of pixels having edge intensity higher than the normalization threshold value; and a block attribute determination unit that determines the attribute of each block based upon the normalization threshold value, the first number of pixels and the second number of pixels obtained in each block.

Further features of the present invention will become apparent from the following description of exemplary embodiments (with reference to the attached drawings).

BRIEF DESCRIPTION OF THE DRAWINGS

FIGS. 7A to 7E are diagrams illustrating examples of relationships between histogram distributions and normalization threshold values of edge intensity of attribute blocks in image processing;

FIG. 8 is a diagram illustrating examples of edge features of attribute blocks in image processing;

FIG. 10 is a flowchart illustrating the details of attribute determination of each connected region in a block;

FIG. 13 is a flowchart illustrating the details attribute determination processing (S204) of a block and attribute correction processing.

DESCRIPTION OF THE EMBODIMENTS

Attribute determination processing using an image processing apparatus according to the present invention will be described in detail with reference to the drawings.

[First Embodiment]

Figure 4:
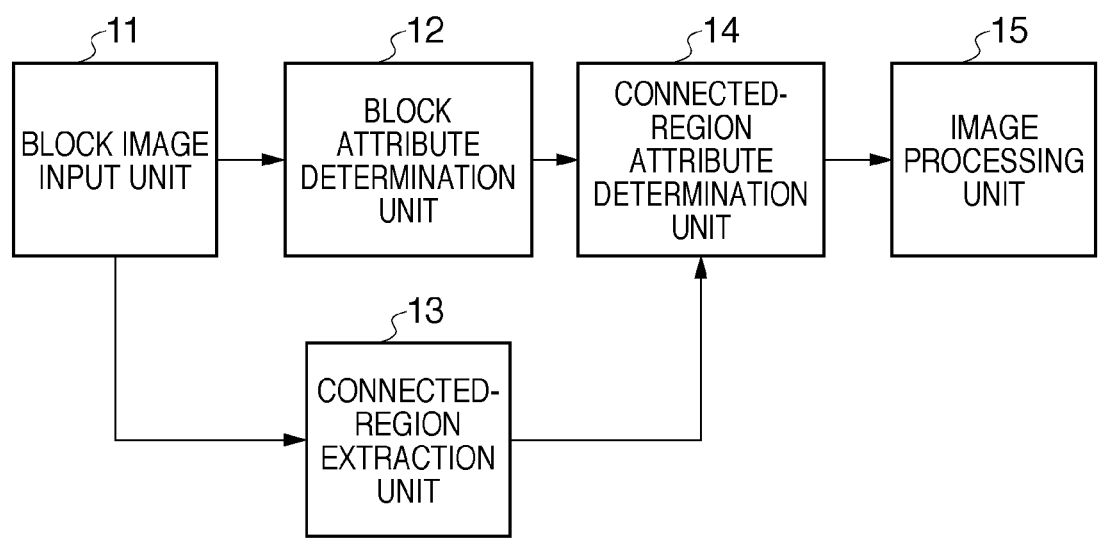
FIG. 4 is a block diagram illustrating the configuration of an image processing apparatus according to a first embodiment of the present invention.

FIG. 4 is a block diagram illustrating the configuration of an image processing apparatus according to a first embodiment of the present invention. A block image input unit 11 inputs a monochrome or color image, which has been read from paper information via an image reader such as a scanner, as image data of a pixel block (referred to simply as a "block" below) composed of a prescribed number of pixels. That is, scanned-in document image data is divided into block images (the document image is divided into tiles) of a predetermined size and each block image is input.

In FIG. 4, a block attribute determination unit 12 determines whether the image data of the block is a base background area, a halftone-dot area, a character area in base background or a character area in halftone-dot background, and assigns attribute information indicating the block attribute. A character area in base background and a character area in halftone-dot background will be described as a "character-on-base" and a "character-on-halftone-dots", respectively.

A connected-region extraction unit 13 extracts a connected region of pixels within a block. A connected-region attribute determination unit 14 determines the attribute of a pixel of a connected region based upon the block attribute. An image processing unit 15 executes image processing pixel by pixel in accordance with the attribute of the pixel determined by the connected-region attribute determination unit 14.

<Overview of Attribute Determination Processing>

Figure 5:
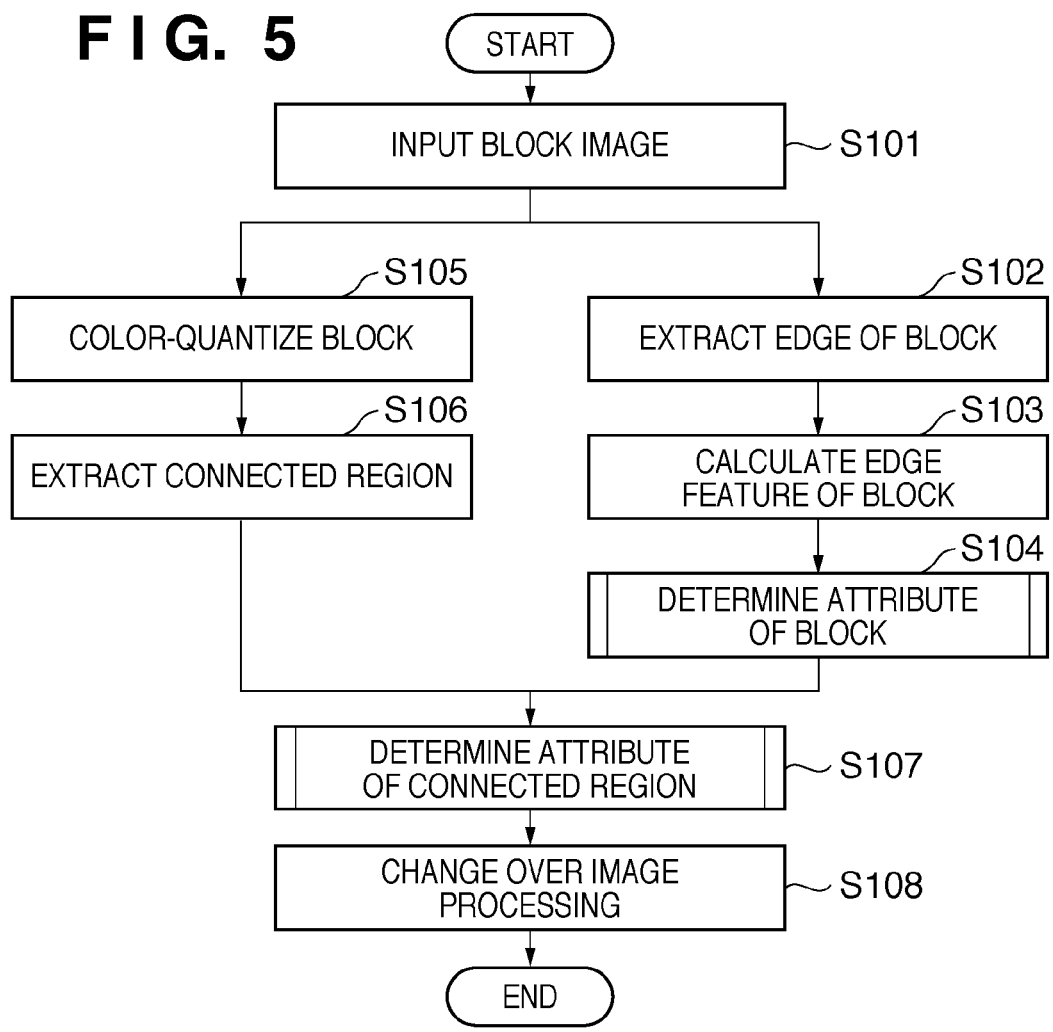
FIG. 5 is a flowchart illustrating processing for determining an attribute of a block and a connected region.

FIG. 5 is a flowchart illustrating processing for determining attributes of a block and a connected region. First, the block image input unit 11 inputs image data of a block comprising a prescribed number of pixels of an image to be processed (step S101). Next the block attribute determination unit 12 extracts an edge in the entered block (step S102) and calculates the edge feature of the block from the extracted edge (step S103). Then, based upon the calculated edge feature, the block attribute determination unit 12 determines whether this block is a base area, a halftone-dot area, a character-on-base area or a character-on-halftone-dots area (step S104).

Edge extraction is processing for generating differential data indicative of edge intensity and it is possible to utilize a well-known filter (a Prewitt filter or Sobel filter, for example) for edge extraction. The edge feature is found from a normalization threshold value, which is determined from maximum and minimum values of the extracted edge intensity, the number of pixels having edge intensity equal to or greater than the normalization threshold value, and the number of pixels having edge intensity equal to or greater than a preset fixed threshold value. The edge feature, the relationship between a histogram distribution and normalization threshold value of the edge intensity of an attribute area, and the edge feature amount of the attribute area will be described later. Determining the attribute of a block involves determining whether the block has the attribute of a base area, halftone-dot area, character-on-base area or character-on-halftone-dots area, based upon the calculated edge feature amount of the block. The details of processing for determining the attribute of a block will be described later.

The connected-region extraction unit 13 applies color reduction processing to (finds the representative color of) the block entered at step S101, quantizes the block pixel by pixel to the representative color of the nearest color (step S105) and acquires a cluster of pixels connected by the same color (step S106). It should be noted that color quantization of a multi-valued image may be achieved by binarization or by color reduction to a number of colors using a method such as the method described in Japanese Patent Laid-Open No. 2002-

142128. Further, it is possible to utilize a well-known labeling process as the connected-region extraction process.

Next, on the basis of the block attribute determined at step S104 and the connected region extracted at step S106, the connected-region attribute determination unit 14 determines the attributes of the pixels of each connected region (step S107). Pixels in a connected region have the same attribute, and each connected region is a collection of pixels of the same attribute. Processing for determining the attribute of a connected region will be described later.

The image processing unit 15 changes over image processing (step S108) pixel by pixel based upon the attribute of the pixels in the connected region determined at step S107.

<Edge Feature Amount>

In order to judge the strength of an edge, generally the edge intensity of a pixel is quantized to a range of 0 to 255. However, this method involves a great amount of calculation. Accordingly, instead of calculating the normalized edge intensity of each pixel in a block, a "normalization threshold value" indicating whether the entire block has a strong edge is calculated.

Figure 6:
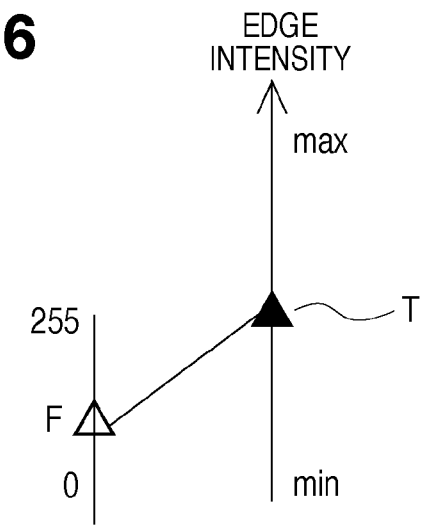
FIG. 6 is a diagram illustrating the relationship between an ordinary normalization range and fixed threshold value of edge intensity and an actual range and a normalization threshold value of edge intensity in image processing.

FIG. 6 is a diagram illustrating the relationship between an ordinary normalization range and a preset fixed threshold value of edge intensity and an actual range and a normalization threshold value of edge intensity in image processing. It is assumed that the ordinary normalization range of edge intensity is 0 to 255 and that the minimum and maximum values of edge intensity of a pixel in a block are min and max, respectively. Further, if we let F represent the preset fixed value and T the normalization threshold value corresponding thereto, then the normalization threshold value T can be found from the following:

$$\max \leq 255 \; T=F$$

$$\max > 255 \; T=\min+(\max-\min) \times F \div 255 \quad \text{Eq. (1)}$$

<Examples of the Relationship Between Histogram Distribution and the Normalization Threshold Value of Edge Intensity of Each Block>

FIGS. 7A to 7E are diagrams illustrating examples of relationships between histogram distributions and normalization threshold values of edge intensity in each block in image processing. Here the vertical axis is a plot of edge intensity and the horizontal axis is a plot of number of pixels having the edge intensity in the applicable block. Since image processing is changed over in accordance with the attribute, namely that of base, halftone dots, character-on-base or character-on-halftone-dots, block attributes are divided into base, halftone dots (composed solely of halftone-dot pixels), character-on-base and character-on-halftone-dots, and an example of a histogram for each attribute is illustrated. Further, as mentioned earlier, a light-color halftone-dot character tends to be erroneously determined to be base. Accordingly, a character on halftone dots is classified into a character on light-color halftone-dots and a character on dark-color halftone-dots and a histogram distribution of edge intensity is illustrated accordingly.

Since the base background block shown in FIG. 7A is a uniform area, the edge intensity of each of the pixels in the block are distributed over very low values. Consequently, the normalization threshold value T is F (120) from Equation (1). A halftone-dot block shown in FIG. 7B is an area composed of a halftone-dot pattern. Although the pixels have high edge intensity, the range of edge intensity is broad overall. Consequently, the normalization threshold value T of the halftone-dot area also has a low value. Characters on halftone dots shown in FIGS. 7C and 7D have normalization threshold values T that are close to each other regardless of whether the halftone-dot pattern is dark or light. Further, the character-on-halftone-dots block is a character area on halftone-dot background, and since the character portion has an edge stronger than that of the halftone-dot pattern, it has a normalization threshold value T considerably higher than that of the halftone-dot area. A character-on-base block shown in FIG. 7E is a character area on base background. Although the base portion has low edge intensity, the character portion exhibits fairly high edge intensity and therefore has a normalization threshold value T higher than that of the character-on-halftone-dots.

<Example of Edge Feature Extraction of Each Attribute Block>

FIG. 8 is a diagram illustrating examples of edge features of attribute blocks in image processing. As illustrated in FIG. 8, blocks have ranges of normalization threshold values that differ for every attribute, as mentioned above. In other words, the normalization threshold value is low for the base and for halftone dots, medium for a character-on-halftone-dots, and high for a character-on-base.

Since a base area has almost no edge, the number of pixels having edge intensity higher than the normalization threshold value is less and the number of pixels having edge intensity higher than the threshold value set low in advance is also less. On the other hand, since the halftone-dot area has a strong edge, there are a higher number of pixels having edge intensity higher than the normalization threshold value and also there are a higher number of pixels having edge intensity higher than the threshold value set low in advance.

Next, since the character on the dark-color halftone dots and the character on the light-color halftone dots exhibit different features, they are analyzed separately. First, since the character on the dark-color halftone dots has a halftone-dot pattern that is strong, the number of pixels having a strong edge is large. Therefore, the number of pixels having edge intensity higher than the normalization threshold value is large and the number of pixels having edge intensity higher than the threshold value set low in advance is large as well. Next, since the character on the light-color halftone dots has a halftone-dot pattern that is weak, the number of pixels having edge intensity higher than the normalization threshold value is not large but the number of pixels having edge intensity higher than the threshold value set low in advance is large. Further, since the light halftone-dot portion exhibits many edges, the number of pixels having edge intensity higher than the threshold value set low in advance is several times larger than the number of pixels having edge intensity higher than the normalization threshold value.

With regard to the base, halftone dots and character-on-halftone-dots mentioned above, the character-on-base is such that the edge of the character portion is very strong. Therefore, the number of pixels having edge intensity higher than the normalization threshold value is large and the number of pixels having edge intensity higher than the threshold value set low in advance is large as well.

<Block Attribute Determination Processing (S104)>

Figure 9:
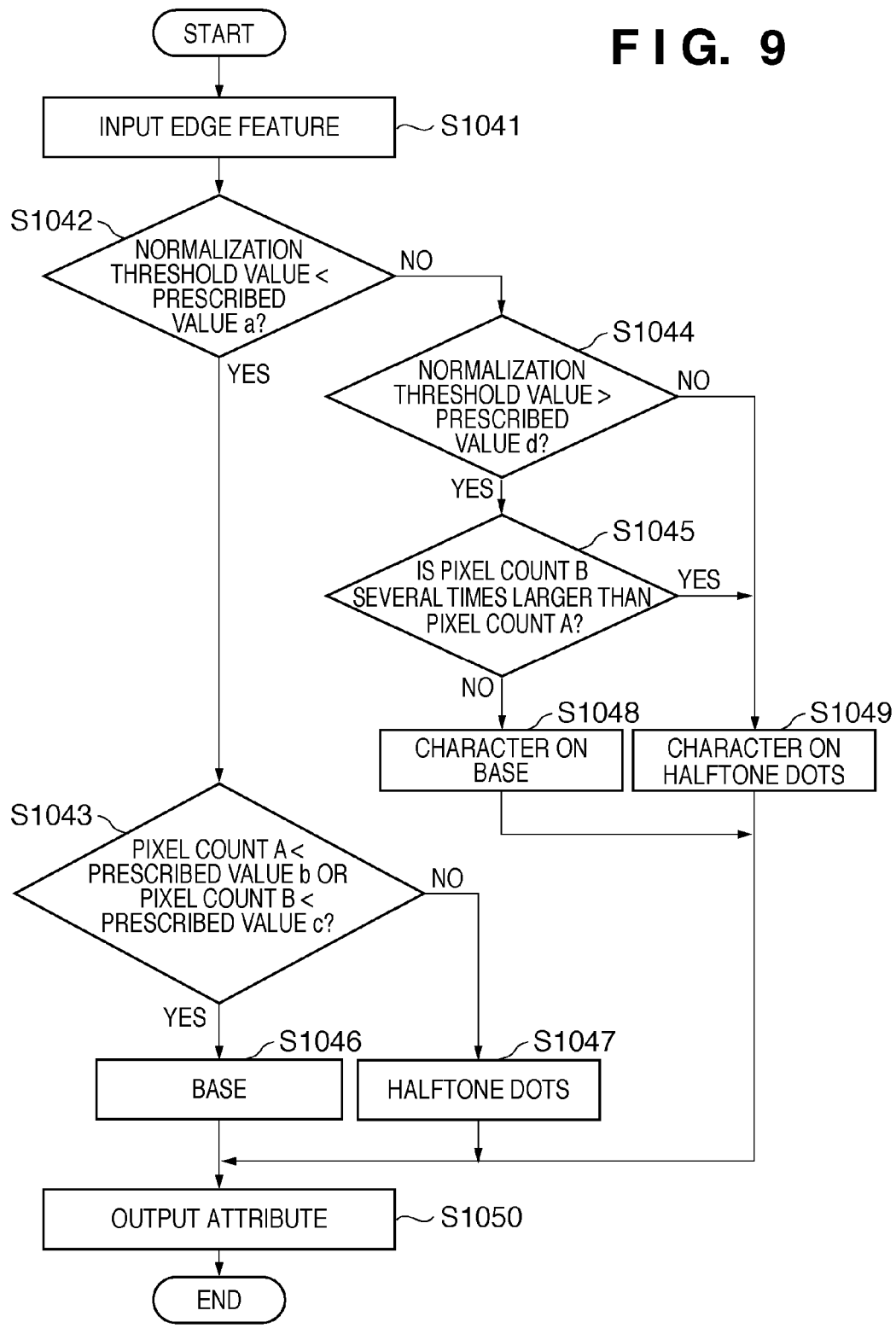
FIG. 9 is a flowchart illustrating the details of attribute determination processing (S104) of a block.

The details of the processing (step S104) for determining the attribute of a block will now be described with reference to FIG. 9. First, at step S1041, the edge feature of the block is input, then the attribute of the block is determined at steps S1042 to S1045. At step S1042, the normalization threshold value of the block is compared with a prescribed value a (a low value of 250, for example). If the normalization threshold value is less than the prescribed value a, it is determined that the attribute is base or halftone dots. If the normalization threshold value is equal to or greater than the prescribed value a, then it is determined that the attribute is a character-on-base or a character-on-halftone-dots.

Next, at step S1043, in order to determine whether the block attribute is base or halftone dots, a comparison is performed using a second number of pixels (pixel count A) having edge intensity higher than the normalization threshold value and a first number of pixels (pixel count B) having edge intensity higher than the fixed threshold value. If the pixel count A is less than a prescribed value b (30, for example) or if the pixel count B is less than a prescribed value c (50, for example), then it is determined that the attribute is the base area (step S1046). However, if the pixel count A is equal to or greater than the prescribed value b or the pixel count B is equal to or greater than the prescribed value c, then it is determined that the attribute is halftone dots area (step S1047).

On the other hand, if it is found at step S1044 that the normalization threshold value is equal to or less than a prescribed value d (500, for example), it is determined that the attribute is a character-on-halftone-dots area (step S1049). Further, if the normalization threshold value is not equal to or less than the prescribed value d, then it is determined whether the attribute is a character-on-base area or a character-on-halftone-dots area. Specifically, if the pixel count B is several times larger than the pixel count A (step S1045, YES), it is determined that the attribute is the character-on-halftone-dots area (step S1049). Otherwise (step S1045, NO), it is determined that the attribute is the character-on-base area (step S1048). When the determination is completed, the determined attribute of the block is output at step S1050.

<Connected-Region Attribute Determination Processing (S107)>

The details of processing for determining the attributes of connected regions in a block will now be described with reference to FIG. 10. In a base background area, a connected region in every block is determined to have a base background attribute, a base flag is made "1" and a halftone-dot flag and character flag are both made "0". Further, in a halftone-dot area, a connected region in every block is determined to have a halftone-dot attribute, the halftone-dot flag is made "1" and the base flag and character flag are both made "0".

In a character-on-base area, each connected region of the character portion is determined to be a character on base, the base flag and character flag are both made "1" and the halftone-dot flag is made "0". Further, the base background portion is determined to be base, the base flag is made "1" and the halftone-dot flag and character flag are both made "0".

In a character-on-halftone-dot area, each connected region of the character portion is determined to be a character on halftone dots, the halftone-dot flag and character flag are both made "1" and the base flag is made "0". Further, the background portion is determined to be halftone dots, the halftone-dot flag is made "1" and the base flag and character flag are both made "0".

Thus, by determining that pixels in each connected region have the same attribute and referring to the attribute flag of the connected region in which the pixel belongs at the time of image processing, image processing can be changed over pixel by pixel.

In the first embodiment, the attribute of a connected region in which each pixel belongs is determined based upon the edge feature amount of a pixel block, thereby distinguishing between a character on light halftone dots and a character on base so that attributes can be determined in highly precise fashion. Further, when light halftone dots and dark halftone dots can be distinguished from each other, the degree of smoothing processing can be adjusted.

Image processing is changed over depending upon whether a pixel is base background, halftone dots, a character on base or a character on halftone dots. However, in a case where it is desired to change over image processing depending upon whether a character pixel is black, and a pixel on base background is white, various attributes may be determined utilizing color information.

[Second Embodiment]

Figure 1:
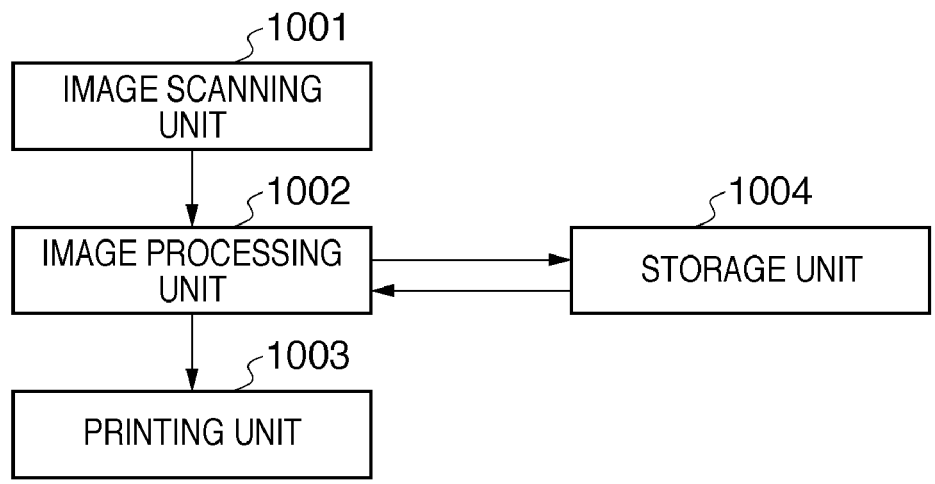
FIG. 1 is a block diagram illustrating the configuration of a digital copier.
Figure 2:
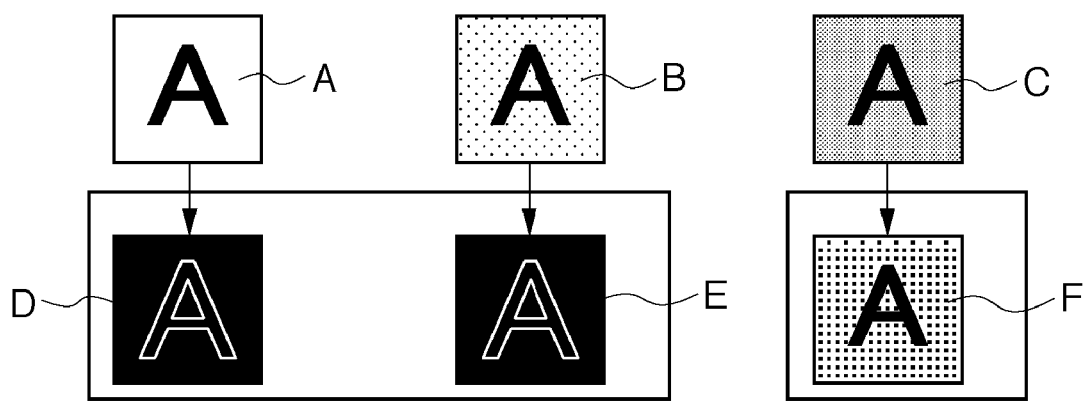
FIG. 2 is a diagram illustrating attribute information of blocks and results of edge detection applied to these blocks.
Figure 3:
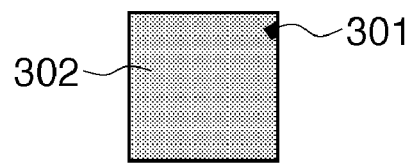
FIG. 3 is a diagram illustrating an example of a small-character area in halftone-dot background.

In the first embodiment, processing for determining the attribute of a pixel block involves determining attributes independently based upon the edge feature of each block. However, erroneous determination occurs in a case where a character area of the kind shown in FIG. 2 includes only a very small character portion. Accordingly, in the determination of the attribute of a pixel block in a second embodiment, the attribute is determined based not only upon the edge feature amount of each block but also upon a difference of the edge feature amount between adjacent blocks.

Figure 11:
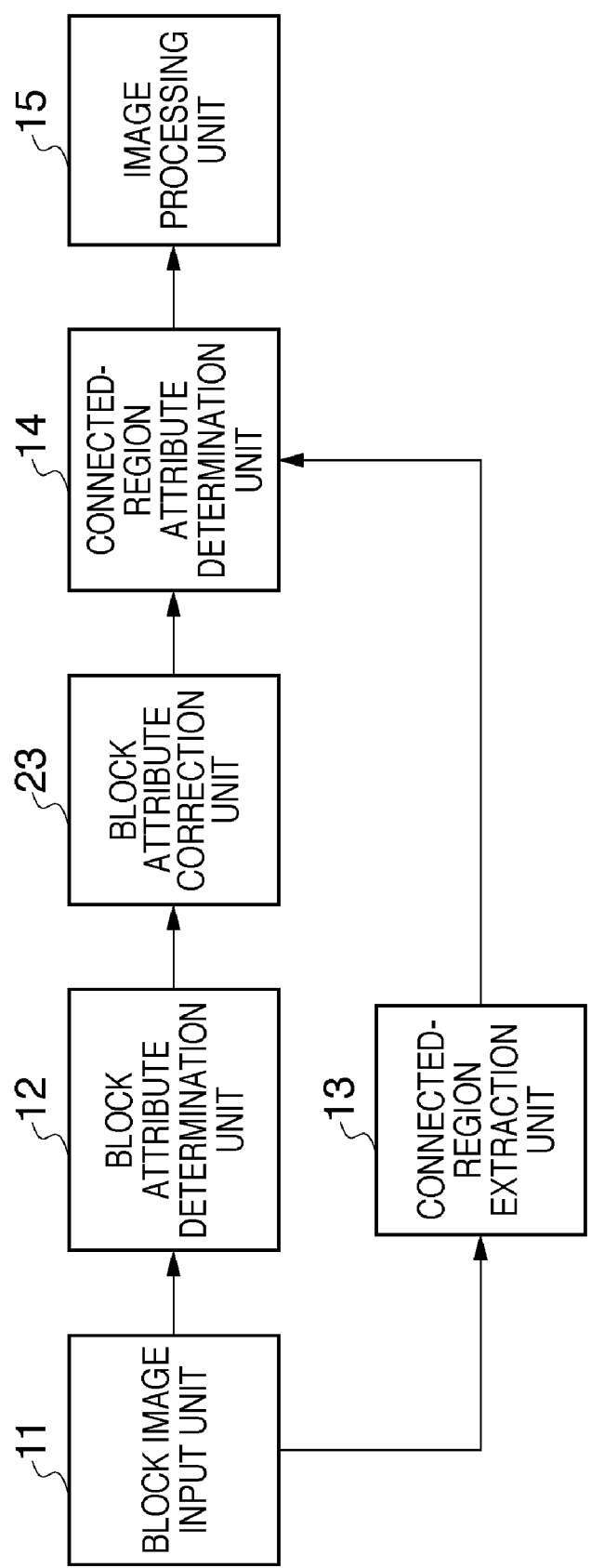
FIG. 11 is a block diagram illustrating the configuration of an image processing apparatus in a second embodiment of the present invention.

FIG. 11 is a block diagram illustrating the configuration of an image processing apparatus according to the second embodiment. This apparatus is obtained by adding a block attribute correction unit 23 to the configuration of the first embodiment shown in FIG. 4. The block attribute correction unit 23 corrects the attribute of a block based upon the attributes and edge features of surrounding blocks.

Figure 12:
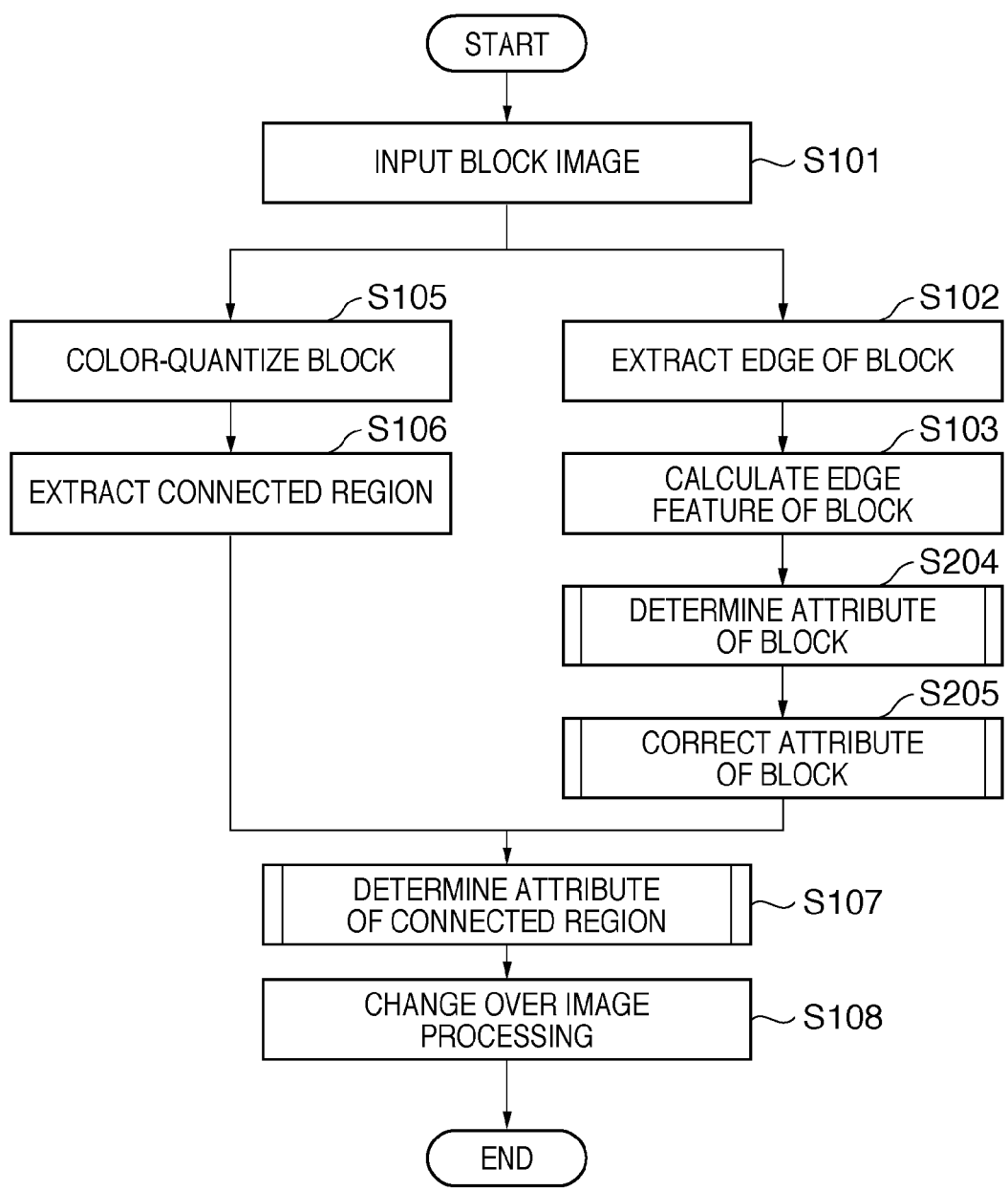
FIG. 12 is a flowchart illustrating the details of attribute determination processing in the second embodiment.

The details of attribute determination processing will be described with reference to FIG. 12. FIG. 12 is a flowchart obtained by replacing the step of block attribute determination (step S104) in FIG. 5 with a new step of block attribute determination (step S204) and a step of block attribute correction (step S205).

First, the block image input unit 11 inputs image data of a block comprising a prescribed number of pixels of an image to be processed (step S101). The block attribute determination unit 12 determines the attribute of a block whose attribute can be determined reliably based upon the edge feature of the block (step S204). Next, at step S204, by referring to the edge features and attributes of neighboring blocks, the block attribute correction unit 23 corrects the attribute of a block whose attribute cannot be determined reliably (step S205).

<Block Attribute Determination Processing (S204) and Attribute Correction Processing (S205)>

The details of block attribute determination processing (step S204) and attribute correction processing (step S205) will be described with reference to FIG. 13. First, at step S2041, the edge feature of the block is input, then the attribute of a block whose attribute information can be decided reliably is determined at steps S2042 to S2045.

At step S2042, the normalization threshold value of the block is compared with the prescribed value. If the normalization threshold value is less than the prescribed value a, it is determined that the attribute is base background or halftone dots. If the normalization threshold value is equal to or greater than the prescribed value a, then it is determined that the attribute is a character on base or a character on halftone dots. It should be noted that the prescribed value a is the same as that in the first embodiment and is a low value (250, for example).

Next, at step S2043, the block that has been determined as a candidate for base or halftone dots has its attribute determined using the second number of pixels (pixel count A) having edge intensity higher than the normalization threshold value and the first number of pixels (pixel count B) having edge intensity higher than the fixed threshold value. If the pixel count A is less than the prescribed value b or if the pixel count B is less than a prescribed value c, then it is determined that the attribute is base background (step S2053). However, if the pixel count A is equal to or greater than the prescribed value b or the pixel count B is equal to or greater than the prescribed value c, then it is determined that the attribute is halftone dots (step S2054). It should be noted that the prescribed values b and c are the same as those in the first embodiment and are low values (e.g., 30 and 50, respectively).

On the other hand, if it is found at step S2044 that the normalization threshold value is equal to or less than a prescribed value e, it is determined that the attribute is a character on base or the character on halftone dots. Specifically, if the pixel count B is several times larger than the pixel count A, it is determined that the attribute is the character on halftone dots (step S2056). Otherwise, it is determined that the attribute is the character on base (step S2055). In order to avoid an erroneous determination that halftone dots are a character on halftone dots and an erroneous determination that a character on halftone dots is halftone dots, the prescribed value e for character determination is made a high value (700, for example).

Further, if the normalization threshold value is not equal to or less than the prescribed value e, then attribute correction processing is executed on the grounds that the attribute of the block cannot be decided reliably. Then, at steps S2046 to S2052, the attribute of this block for which the block attribute information cannot be decided reliably is determined.

At step S2046, reference is had to the edge feature and attribute of the block neighboring on the left. Next, at step S2047, the normalization threshold value of the target block and the normalization threshold value of the left block are compared. If the difference is less than a prescribed value f, then at step S2048, the attribute of the target block is corrected to be the same attribute as that of the left block. On the other hand, if the difference is equal to or greater than the prescribed value f, then an attribute correction is performed upon examining the attribute of the left block. Correction processing executed of steps S2049 to S2052 in a case where the left block has the halftone-dot attribute will now be described.

If it is determined at step S2049 that the left block has the halftone-dot attribute and, moreover, it is determined at step S2050 that the target block has a normalization threshold value greater than that of the left block and that a pixel count A of the target block (a number of pixels having edge intensity higher than the normalization threshold value in the target block) is less than that of the left block ("YES" at step S2050) then it is determined that the target block has an edge feature different from that of the halftone dots. At step S2051, it is determined that the target block is the character on halftone dots. If a "NO" decision is rendered at step S2052, then it is judged that the target block has an edge feature close to that of halftone dots and it is determined that the target block is halftone dots. When the above-described determination thus ends, the determined attribute of the block is output at step S2057.

Attribute determination processing of a character on halftone dots in which the block to the left of the target block is a halftone-dot area and the attribute of the target block tends to be erroneously determined to be the halftone-dot attribute has been described. However, even in a case where the left block has an attribute other than the halftone-dot attribute, it is possible to subject the block to an attribute correction if note is taken of the difference between the edge feature of the target block and the edge feature of a neighboring block.

Thus, in accordance with the second embodiment as described above, it is possible to determine the attribute of an area accurately even in difficult cases, such as in the case of a character area on halftone dots, in which the area tends to be erroneously determined to be a halftone-dot area, and in the case of halftone-dot area, in which the area tends to be erroneously determined to be a character area on halftone dots.

It should be noted that an example has been illustrated in which an attribute correction is performed by referring to the attribute information of the block neighboring on the left. It goes without saying, however, that the same effects are obtained also by referring to the attribute information of the block neighboring above or the attribute information of a plurality of blocks.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-001564, filed Jan. 6, 2010, which is hereby incorporated by reference herein in its entirety.

What is claimed is:

1. An image processing apparatus comprising:
    a dividing unit that divides image data into a plurality of blocks, each of which are composed of a prescribed number of pixels;
    an edge extraction unit that obtains edge intensity of each pixel contained in each block obtained by division;
    an edge feature extraction unit that obtains, in each block, a normalization threshold value based upon a maximum value and a minimum value of the edge intensity, which has been obtained by said edge extraction unit, and a preset fixed threshold value, and further obtains both a first number of pixels having edge intensity higher than the fixed threshold value and a second number of pixels having edge intensity higher than the normalization threshold value; and
    a block attribute determination unit that determines the attribute of each block based upon the normalization threshold value, the first number of pixels and the second number of pixels obtained in each block.

2. The apparatus according to claim 1, wherein said block attribute determination unit determines the attribute of each block as any one of a base area, a halftone dots area, a character-on-base area and a character-on-halftone-dots area, based upon the normalization threshold value, the first number of pixels and the second number of pixels obtained in each block.

3. The apparatus according to claim 2, wherein said block attribute determination unit comprising:
    a first determination unit that determines whether the normalization threshold value is smaller than a first predetermined value;
    a second determination unit that determines whether the second number of pixels is less than a second predetermined value or whether the first number of pixels is less than a third predetermined value, in a case where it is determined by the first determination unit that the normalization threshold value is smaller than the first predetermined value;
a third determination unit that determines whether the normalization threshold value is larger than a fourth predetermined value, in a case where it is determined by the first determination unit that the normalization threshold value is not smaller than the first predetermined value;
a fourth determination unit that determines whether the first number of pixels is several times larger than the second number of pixels, in a case where it is determined by the third determination unit that the normalization threshold value is larger than the fourth predetermined value; and
an attribute determination unit that:
determines the attribute of each block as the base area when the second determination unit determines that the second number of pixels is less than the second predetermined value or that the first number of pixels is less than the third predetermined value;
determines the attribute of each block as the halftone dots area when the second determination unit determines that the second number of pixels is not less than the second predetermined value or that the first number of pixels is not less than the third predetermined value;
determines the attribute of each block as the character-on-base area when the fourth determination unit determines that the first number of pixels is not several times larger than the second number of pixels; and
determines the attribute of each block as the character-on-halftone-dots area when the third determination unit determines the normalization threshold value is not larger than the fourth predetermined value or when the fourth determination unit determines that the first number of pixels is several times larger than the second number of pixels.

4. The apparatus according to claim 1, further comprising:
a connected-region extraction unit that extracts a cluster of pixels connected by the same color within each block as a connected region; and
a connected-region attribute determination unit that determines an attribute of the extracted connected region based on the attribute of each block determined by the block attribute determination unit.

5. The apparatus according to claim 1, further comprising a block attribute correction unit that corrects the attribute of the block, which has been determined by said block attribute determination unit, based upon a neighboring block.

6. The apparatus according to claim 1, wherein said block attribute determination unit comprising:
a first determination unit that determines whether the normalization threshold value is smaller than a first predetermined value;
a second determination unit that determines whether the second number of pixels is less than a second predetermined value or whether the first number of pixels is less than a third predetermined value, in a case where it is determined by the first determination unit that the normalization threshold value is smaller than the first predetermined value;
a third determination unit that determines whether the normalization threshold value is larger than a fourth predetermined value, in a case where it is determined by the first determination unit that the normalization threshold value is not smaller than the first predetermined value;
a fourth determination unit that determines whether the first number of pixels is several times larger than the second number of pixels, in a case where it is determined by the third determination unit that the normalization threshold value is larger than the fourth predetermined value;
a fifth determination unit that determines whether a difference between the normalization threshold value of a target block and the normalization threshold value of an adjacent block is smaller than a fifth predetermined value, in a case where it is determined by the third determination unit that the normalization threshold value is not larger than the fourth predetermined value;
a sixth determination unit that determines whether the attribute of the adjacent block is a halftone dots area, in a case where it is determined by the fifth determination unit that the difference is not smaller than the fifth predetermined value;
a seventh determination unit that determines whether the normalization threshold value of the target block is larger than the normalization threshold value of the adjacent block and whether the second number of pixels in the target block is less than the second number of pixels in the adjacent block, in a case where it is determined by the sixth determination unit that the attribute of the adjacent block is the halftone dots area; and
an attribute determination unit that:
determines the attribute of each block as the base area when the second determination unit determines that the second number of pixels is less than the second predetermined value or that the first number of pixels is less than the third predetermined value;
determines the attribute of each block as the halftone dots area when the second determination unit determines that the second number of pixels is not less than the second predetermined value or that the first number of pixels is not less than the third predetermined value;
determines the attribute of each block as the character-on-base area when the fourth determination unit determines that the first number of pixels is not several times larger than the second number of pixels;
determines the attribute of each block as the character-on-halftone-dots area when the fourth determination unit determines that the first number of pixels is several times larger than the second number of pixels;
determines the attribute of the target block to the same attribute as that of the adjacent block when the fifth determination unit that determines that the difference between the normalization threshold value of the target block and the normalization threshold value of the adjacent block is smaller than the fifth predetermined value;
determines the attribute of each block as the character-on-halftone-dots area when the seventh determination unit determines that the normalization threshold value of the target block is larger than the normalization threshold value of the adjacent block and that the second number of pixels in the target block is less than the second number of pixels in the adjacent block; and
determines the attribute of each block as the halftone dots area when the sixth determination unit determines that the attribute of the adjacent block is not the halftone dots area or when the seventh determination unit determines that the normalization threshold value of the target block is not larger than the normalization threshold value of the adjacent block or that the second number of pixels in the target block is not less than the second number of pixels in the adjacent block.

7. An image processing method executed by an image processing apparatus, said method comprising:
- a dividing step of dividing image data into a plurality of blocks, each of which are composed of a prescribed number of pixels;
- an edge extraction step of obtaining the edge intensity of each pixel contained in each block obtained by division;
- an edge feature extraction step of obtaining, in each block, a normalization threshold value based upon a maximum value and a minimum value of the edge intensity, which has been obtained at said edge extraction step, and a preset fixed threshold value, and further obtaining both a first number of pixels having edge intensity higher than the fixed threshold value and a second number of pixels having edge intensity higher than the normalization threshold value; and
- a block attribute determination step of determining the attribute of each block based upon the normalization threshold value, the first number of pixels and the second number of pixels obtained in each block.

8. A program, which has been stored on a non-transitory computer-readable storage medium, for causing the computer to execute the image processing method set forth in claim 7.

* * * * *